United States Patent [19]

Rubenstein

[11] 3,742,985
[45] July 3, 1973

[54] REINFORCED PIPE
[75] Inventor: David Rubenstein, San Diego, Calif.
[73] Assignee: Chemstress Industries, Inc., Los Angeles, Calif.
[22] Filed: Oct. 29, 1970
[21] Appl. No.: 85,280

Related U.S. Application Data

[60] Continuation of Ser. No. 871,213, Sept. 4, 1969, which is a division of Ser. No. 613,398, Jan. 31, 1967, Pat. No. 3,489,626, which is a continuation-in-part of Ser. No. 427,861.

[52] U.S. Cl............... 138/141, 52/309, 138/155, 138/176
[51] Int. Cl............................................. F16l 9/22
[58] Field of Search.................. 138/141, 174, 175, 138/176, 108, 143, 145, 150, 151, 155; 52/230, 224, 225, 309; 161/88, 178; 117/94, 123; 156/162, 86, 171, 172, 304; 264/79, 133, 175, 270, 173, 228

[56] References Cited
UNITED STATES PATENTS

| | | | |
|---|---|---|---|
| 2,053,307 | 9/1936 | Wilson | 264/173 |
| 2,120,309 | 6/1938 | Carson | 117/94 |
| 2,236,107 | 3/1941 | Miller | 138/176 |
| 2,614,058 | 10/1952 | Francis | 138/145 |
| 3,177,902 | 4/1965 | Rubenstein | 138/176 |
| 2,348,477 | 5/1944 | Jenkins | 138/176 X |
| 2,522,165 | 9/1950 | Crom | 138/176 |
| 2,706,498 | 4/1955 | Upson | 138/176 X |
| 3,282,301 | 11/1966 | Ligon | 138/175 |
| 3,506,752 | 4/1970 | Varnell et al. | 138/176 X |

Primary Examiner—George E. Lowrance
Assistant Examiner—Robert I. Smith
Attorney—R. Welton Whann and Robert M. McManigal

[57] ABSTRACT

This patent application provides reinforced, composite concrete pipe having polymeric resin composition, filler and fiber reinforcement providing high strengths and resistant features to corrosion and environmental conditions. Joinery means for making pipelines of the individual pipe elements is provided and includes methods of making resilient resistant joinery and shock absorbinb joinery and pipe features of construction. The pipe has interior and exterior laminated constructions on porous structural material bodies, and includes also polymeric resin composition, filler and fiber reinforcements within the body of the porous structural material as a unitary structured material. Force systems derived from ehcmical means of stressing as well as thermal and mechanical means of prestressing preloads into the structure of the made pipe and pipelines comprise components of structure of the said reinforced, composite concrete pipe and pipelines.

2 Claims, 21 Drawing Figures

REINFORCED PIPE

This application is a ontinuation of my then copending application Ser. No. 871,213, filed Sept. 4, 1969, which is a division of my copending application Ser. No. 613,398, filed Jan. 31, 1967, now issued into U.S. Pat. No. 3,489,626, which, in turn, is a continuation-in-part to my then copending application Ser. No. 427,861.

This invention relates to prestressed laminated pipe, tanks, and vessels and joinery constructions for the same.

An object of this invention is to provide interior and exterior surface layer constructions of composite structured embodiments of the invention having substantial resistance to corrosion, adverse chemicals and resistant to residual nuclear radiation.

An object of this invention is to provide reinforced concrete pipes, tanks, and vessels having within the walls thereof, internal pipes and tubes suitable for circulation of heating or cooling or processing fluids, gases or solids within the body of the pipes, tanks, and vessels.

Another object of this invention is to make reinforced porous structural material pipes, tanks or vessels of substantial strengths with preformed and packaged non-metallic reinforcements or with non-metallic reinforcements in combination with metallic reinforcements.

This invention makes it possible to design pipes, tanks and vessels and joinery for the same with properties and characteristics tailored to the particular requirements of use. It is thus possible to accentuate any desirable characteristic, such as resilient construction, moisture or fluid impermability, shockproofing, thermal insulation, or thermal conductivity, smoothness, lightness, superior load bearing properties in compression, tension, shear, and torsion. All these properties can be designed into the products of the invention and all factory produced. In addition embodiments of this invention can be made fire-proof or fire-resisting, and especially can be made to be chemically resistant to many adverse chemical influences.

These and other objects of the invention will be apparent from the drawings and the following description thereof. Referring to the drawings which are for illustrative purposes of the invention;

My copending application Ser. No. 427,861, filed Jan 25, 1965, refers to prestressed preloaded structures and constructions which include features of the present invention and the disclosures for the same are considered in said application but not claimed therein. Such disclosures in said application are to be taken as though herein written.

The present invention provides pipes, tanks and vessels having greatly improved strengths and surface layer constructions resistant to impact, abrasion corrosion, chemicals and nuclear wastes. The joinery for said products is an improved joinery method and product which not only provides joinery means and normal expension and contraction features but provides high order of blast and impact resistance features.

These prestressed preloaded constructions employ prestressed preloads as a component of the structures made derived from forces gnerated in and of chemical reactions, as e.g., polymerization reactions, used alone, or together with mechanically and/or thermally induce and derived force systems.

Preformed porous structural materials, e.g., concrete or resin-crete concrete, or elastomer-crete concrete of any desired type of mixture and strength provide components of structure of compressionally strong material. This may be used as a set and cured and "preshrunk" component, or may be built in place with other components of pipe structure. Plastic resins, e.g., catalyst-activated, cross-linked polymers of synthetic resins combined with modifying agents, inert fillers, extenders, pigments, elastomeric materials and rubbers of the type disclosed and claimed herein provide the plastic resin reinforcement, binders and adhesive components. Such plastic resins may be polymerized as 100 percent polymerizable polymeric resin compositions in homogenous films as layers in a single application, or can be in multiple applications of single resins or different resins, and either placed at one time or in sequence or in spaced apart times of applications, and this for convenient processing.

Some of the polymeric resins used comprise compositions selected from the group consisting of unsaturated polyester resins, epoxy resins having a curring agent therefor, silicone resins, polyurethane resins, vinyl resins, unsaturated polyester resins in combination with epoxy resins, unsaturated polyester- acrylic resins, epoxy-polyamine resins, epoxy-polyamide resins, epoxy-polysulfide resins, epoxy-coal tar resins, epoxy-vinyl chloride resins, epoxy-asphaltic resins, epoxy-phenolic resins, epoxy-fluorinated resins, epoxy-furfural resins, epoxy-isocyanate, polyurethane resins, epoxy-polyethylene resins, epoxy-propolene resins, epoxy-silicone resins, but not limited thereto since new resins are being produced frequently and are useful in this invention.

Fibers of glass fiber, the preferred fiber of this invention as of the present, but not limited thereto, or natural fibers like hemp, cotton, sisal, etc., or synthetic fibers like nylon, polyethylene terephthalate (Dacron), acrylic fibers (Orlon) or (Dynel), etc., and/or fuzed quartz, aluminum-silicate fibers (Fibrefrax) ceramic spun fibers, silicon carbide single crystal fibers (whiskers), boron fibers, sapphire whiskers, refractory fibers, asbestos, etc., with fibers of both organic and inorganic fibrous materials being unsed together in any desired combination, or used alone, to provide nonmetallic and metallic reinforcements and/or fillers for this invention. Prestressing type steel wire, cable or rod reinforcement is used alone or in some constructions in combination with polymerizable polymeric resin compositions and/or elastomeric resin compositions, and with or without fibrous reinforcements.

It is known that concrete shrinks on curing. This shrinkage is variable and is generally considered to extend over a long time, with the greatest amount 0f shrinkage occuring in a bout 28 days of curing under moist curing conditions at normal temperatures, e.g., 72°F. Concrete does not follow Hook's Law within the elastic limits of the concrete, there being a certain amount of "plastic flow"under load. Identical deformation under load is followed by a slow secondary deformation due to applied load. In a concrete construction that is deformed a fixed amount by applied load, the strain necessary to maintain deformation gradually decreases in amount to a lesser substantially constant amount of strain resulting in a permanent internal stress of the concrete.

In prestressing concrete by means of winding wire or calbes under tension about the concrete pipes, the wire is covered with concrete and cured about the wire. This results in adverse features of shrinkage of curing having to be taken into account and from said shrinkage allowance made for the loss of prestressed preload in the wire.

I have found that a "preshrunk" concrete, etc., that is a concrete or other porous structural material component has substantially reduced shrinkage and plastic flow problems. Particularly, this is so in the impregnated and permeated porous structural materials having the resinous compositions comprising substantial portions of its integrated composition and structure. I have found that thinner shells or walls can be used because of the higher strength composite materials of concrete and resin. In this specification the wore "concrete" includes by definition any useful porous structural material made with Portland Cement or e.g., made with resinous binders in place of Portland Cement. Also the composite materials provide a concrete, etc., structure adapted to use in places where ordinary concrete or similar porous structural materials fall, e.g., for various reasons, for example, acid soils, or salt water or ground water corrosion borne materials. Deterioration of ordinary concrete sewer lines is a very extensive and costly problem due to corrosion of the concrete above the water line in a sewer caused by the hydrogen sulfides or sulfates present in said sewer lines. Corrosion resistant pipes tanks and vessels are easily made by this invention and are improvements for chemical lines and chemical process tanks and vessels.

To overcome the inherent structural limitations that coating on a surface of a porous structural material causes by the failure of bond at the adhesive interface by reason of impact or adverse loading, or by corrosion, I make a surface construction layer having very substantially constructed anchorages into and of the porous structural material. This, for example, may be a concrete material comprising the compression component of the embodiment of the invention with a resin, or a resinous or elastomeric composition placed on and into the body of said proous structural material, and which provides when set and cured in said body, a resin or elastomeric or resinous solid having a predetermined or selected amount of prestressed preload obtained ashrinkage forces occuring in the polymerization of the said resin or elastomeric or resinous material. I have found that Ican provide a balanced design of structure in the surface construction layer of an embodiment of the invention.

This shrinkage provides stressing means which utilizes the substantial and large forces resulting from the chemical reactions of for example, the polymerization reaction of thermosetting resins and the like, as well as the expansion forces of the materials of the laminate, whereby the plastic resins, resinous substances, resin-elastomeric substances and elastomeric substances and/or rubbers, congeal, set, fix, and shrink-fit into place. The forces so generated as the same time prestress the materials of the surface construction layer and its adjacent body of porous structural material, e.g., concrete, which the plastic resin or resinous or elastomeric compositions inclose and bond together as well as prestress the concrete bodies to which the laminations comprising the surface construction layers are applied and on the completion of said chemical reaction, e.g., polymerization, integrates the combination into unitary structure, e.g., a pipe section, a tank, a vessel or a joinery construction.

The transfer of stress into the precast concrete component or other component, is accomplished by contact of the plastic resins, for example, unsaturated polyester resins, or by other resins that fill porous holes and interstices connected therewith, and by the general porosity of the concrete, and on bonding together with the plastic resins, fiber glass ,or other fibers or reinforcements, fillers, steel wire, or cable reinforcements with the concrete. The shrinkage stresses of the plastic resins, e.g., unsaturated polyester resin compositions, and other components, that com about by heating and cooling, setting or fixing and/or chemical reactions thus introduce prestress forces into the concrete for ultimate use, and thus makes them stronger, resilient, flexible and better suited to end uses.

This can be linkened to the same thing as occurs to a wooden wheel when a blacksmith "sweats-on" a steel or iron rim and the wheel becomes tightened as the wood of the wheel takes up the prestress stresses intorudced by the shrinkage of the cooling iron or steel.

In combination with thermal pre-compression or tension forces, or forces generated in-situ, the chemical forces provide means alone or in combination with thermal and mechanical prestressing to provide prestressed preload in and of and with the materials of the composite structure making up the prestresses constructions, e.g., pipe, tank, or vessel. The stresses of shrinkage or expansion resulting from such a reaction chemically induced as for example, said reaction occuring in the setting and curing of an unsaturated polyester resin composition, are transmitted as the complext streses of shrinkage in the plastic composition through the interface bond area of the laminated structure or construction or pipe, tank or vessel or joinery construction as compressive stress in the surface of the bonded materials and the area adjacent the surface of the bonded materials.

The Figures showing illustrations of embodiments of this invention show various constructions of pipe, tanks and vessels and joinery for the same which are coated, laminated and integrated on their surfaces and in their body structures with plastic resin bonded fibrous reinforcements, e.g., glass fibers or synthetic fibers, etc., as disclosed herein with compositions which may also contain other fillers, fibers, bonding agents, binders or reinforcements in addition to or instead of the fibrous materials, for example, glass fibers.

Pipe, or tanks, or vessels as is shown in the Figures are made and advantageously used for water conduits, irrigation lines, aqueducts, sewers, sewer manholes, sewage processing constructions, fluid transmission lines in industry, commerce and military operations, crude and processed oil lines, gas lines and any other useful use.

A typical embodiment of a pipe, tank or vessel comprises a concrete body as shown in the figures having a filament wound polymerized polymeric resin composition embedded fiber construction, e.g., glass fibers as roving placed under tension. Such polymerized polymeric resin composition can be an unsaturated polyester resin, or an epoxy resin composition having a curing agent therefor, or a polyurethane resin compositin, or other compatible resinous compositions or combinations of two or more resins, elastomers or rubber substances. The novel features of each material and the combined features of combination of the materials provide the novel features of surface layer constructions in combination with the concrete or concrete like materials used. I find that the strengths and load bearing features are greatly increased by the laminated construction, and particularly by the integrated construction of the combination of the resin compositions and the concrete body. The concrete is excellent for compression loading in resisting compressive strains and the glass fibers or other selected reinforcement affords high resistance to tensile stresses in combination with the polymeric resins selected for their specific strengths in adhesion and bond and to their adding substantially to the strengths in shear, tension, torsion and compression of the composite structure made.

Pipes thus made have an improved "K" factor, "C" factor, or other designation depending upon the flow formula used to express the coefficient of smoothness. In embodiments of my invention the surfaces are extremely smooth and uniform, and as a consequent such pipes deliver for example, 15 to 25 percent or more water (or otherfluid). Because friction is reduced to a minimum, turbulence and joint obstructions to flow are practically eliminated. Resin bonded and reinforced joinery solves many problems, leakage and entrance of root or other growths into pipes through joints being restricted or eliminated.

When such pipe or tanks or vessels are used in corrosive soils or for transmission of corrosive liquids, the plastic resin glass fiber construction protects the concrete and there is no danger of failure due to corrosion of reinforcing rods, etc.

The plastic-resin-fiber-glass reinforced surface construction layers integrated and bonded to the inside of the outside of a porous structural body, e.g., a concrete pipe body, can be made resilient and resistive, pliable and yet strong and able to take without failure, greater strains and stresses in tension, compression, shear and torsion. In all embodiments the concrete or other porous structural material protects the plastic resin surface construction layers from heat and abrasion, and notch and scratch effects are avoided. The plastic resin composition protects the concrete, or the like and strengthens it.

If desired, a thin cylindrical steel core, or a plastic resin-fiber-glass laminated core may be used within the pipe body upon which wire or fiber glass strands embedded in a plastic resin composition suitable for prestressing is wound or spun on said core. Also this may be embedded in a suitable layer of concrete which is then cured and dried. A plastic resin composition such as an unsaturated polyester resin compositio or an epoxy resin composition, etc., may then be applied by spraying, embedding, layering, painting dipping or other method, including "spray-spinning." Into this layer of plastic resin composition and discrete binding components, glass fibers, or other fibers, can be applied to bond and unite with the concrete pipe body, thus providing added strength as above descrbied, and fluid tight sealing of the surfaces obtained.

On a polished stainless steel core or mandrel, or aluminum core with a highly polished surface, or other mandrel covered with cellophane, or other film or sheet, a coat of polymeric resin composition can be spray spun by revolving the mandrel and filament winding fiber glass roving or other fiber until a desired thickness of fiber glass embedded in said polymeric resin composition is provided. The polymeric resin composition may have an ambient setting catalyst or curing agent therein, or the resin can be cured by heat as is known in the art. Thus a polymeric resin composition fiberlglass, or other fiber reinforced pipe or pipe liner is made.

The use of specific formulated resin compositions provides corrosion resistant constructions such as for example, an epoxy-polyamine resin composition filled with asbestos and acrylic fibers applied over a filament wound glass fiber construction. Such an embodiment is resistant to sewer gases and sulfuric acid.

Figure 8:
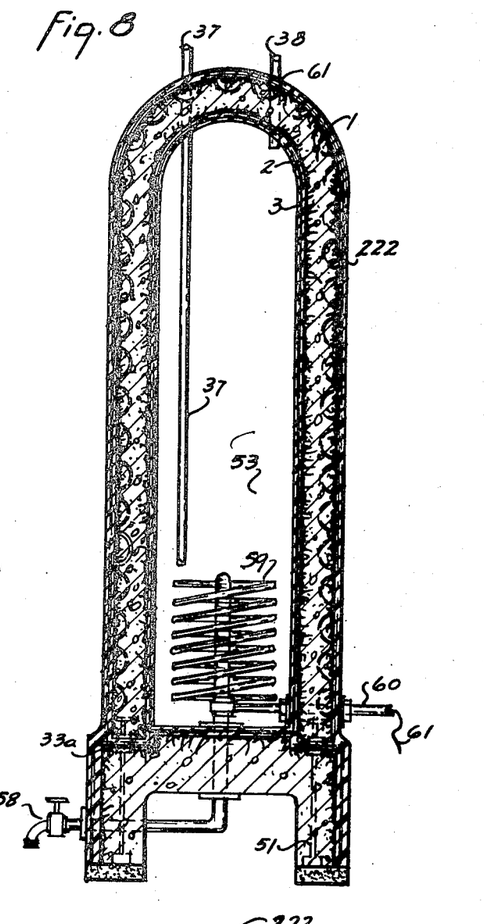
FIG. 8 is a view in vertical section of another tank or process vessel.

When more than contact bonding and adhesion is required in an embodiment of the invention, the feature of FIG. 8, element 222 provides a series of cable-like loops 222 in which the fiber is protected by shielding with the plastic resin composition. These loops project into the concrete body to give anchorage for the facing material, e.g., concrete placed thereover. With this method of manufacture, the facing may be preformed with the loops and the concrete or other material applies as a coating, e.g., by the "spray-sun" method or by casting in suitable forms.

A series of sections of concrete pipe may be joined into a long pipe line or conduit of high strength by means of the fiber-resin facing formed in-situ, i.e., by spray spinning, or othemeans, with effect similar to that described in connection with the joining of concrete block or other structural elements of my invention. These joinery laminated constructions have high tensile strength plastic resin composition fiber reinforced laminated layers which join together two pipe bodies into unitary structure. Such joinery has high resistance to shock and therefore is advantageous means for use in areas where earthquakes or bomb shock may be found, or wherever a rigid construction is required, but one which may accommodate substantial resilient flexure with no impairment to the unit pipes or their joints.

A further improvement can be accomplished by incorporating in the concrete a quantity of polymerizable polymeric resin material, either air-setting, or chemical setting, or thermosetting. When the concrete mixture has been poured and set, the polymeric resin composition effects a reinforcement of the concrete within its porous structure. The polymeric resin composition may be thermosetting or thermoplastic or elastomeric resin composition and in its combination with the concrete material may be combined therewith in any feasible manner. It may be softened and flowed in the porous structure of the concrete, or it may be dispersed in dry particles that are combined by heating of the whole body, or it may be chemically combined by chemical means, or e.g., solvent or by radiation means.

The concrete or other porous structural material may be comprised of ordinary concrete mateials, light weight concrete materials, or any other particulate aggregate useful or required. filler,s including cotton, wool, simal, heap, cotton seed hulls, straw, grasses, wood, bamboo, nylon, or paper, or other materials known in the art may be used in the preactice of this invention.

Figure 1:
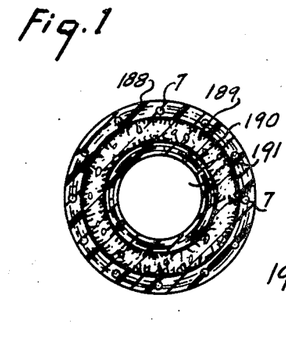
FIG. 1 is a cross section of a prestressed concrete pipe reinforced with packaged preformed plastic resin-fiber reinforced constructions and having joinery means therefor.
Figure 2:
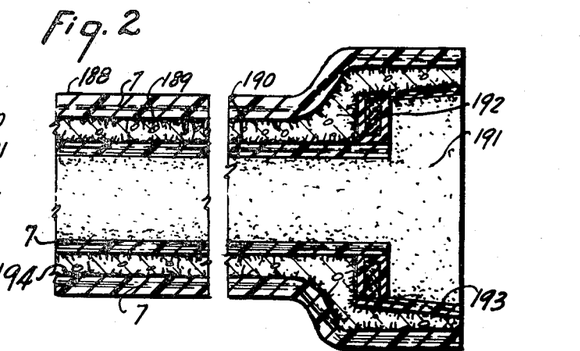
FIG. 2 is a longitudinal section of FIG. 1.

Referring now to the Figures, FIGS. 1 and 2 show a cross-section and a longitudinal section of a prestressed concrete pipe reinforced with packaged preformed plastic resin-fiber reinforced constructions and embodying a resilient resisting, resistantly resisting and yielding resisting method of joinery. In the drawings, fibers 7 are reinforcement placed on the inside of and the outside of concrete pipe constructions in multidirectional manner as well as in unidirectional manner. The unidirectional reinforcement being shown as cable-like forms spaced conveniently around the pipe and extending in a longitudinal direction along the pipe. The unidirectional reinforcement may extend along the pipe in straight linear lengths or it may be spirally wound. Member (189) shows the precast concrete pipe body which may be of any selected size and any selected concrete mixture, or the like, or it may be clay products or non-ementitious polymeric resin comporisiong bound concrete.

The spae 191 can be formed by any one of several means disclosed herein or by inflation of an envelope by means shown in my envelope 188 may be advanced over concrete 189.

Member 192 represents a resistantly resisting, resiliently resisting and yieldingly resisting joint that is bonded securely to the face of the concrete adjacent thereto. Member 193 represents adhesive sealing means such as bonding resins. Member 192 contains structural reinforcement such as a cable comprised of fibers 7 embedded in polymeric resin composition, e.g., epoxy-polyamide resin composition. Member 194 represents the penetrating and permeating polymeric resin composition used in physical and chemical bonding of the inner and outer envelopes to the concrete pipe body concrete or the like.

Composite concrete pipe made in this manner can be made in a factory or in the field at the site of use. Such pipe is particularly useful where large conduits are required on the order of from two feet to twenty feet in diameter, but not limited thereto. Also where field conditions indicate additional strength is required for overburden or poor bearing the pipe can be additionally reinforced by adding additional laminations of the packaged preformed laminated reinforcements and used in service in very short periods of time.

Prestressing of the pipe can be accomplished by chemical means, in the shrinkage of the resins during their polymerization or in the shrinkage of the packaging envelope or envelope component by the use of heat shrinkable resins used for the envelope material, or by physical means by mechanical devices, or by thermal means. These methods may be used alone or any of them in combination.

Figure 3:
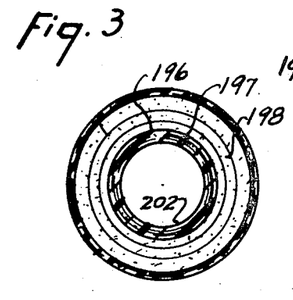
FIG. 3 is another view of a cross section of an embodiment of the invention.
Figure 4:
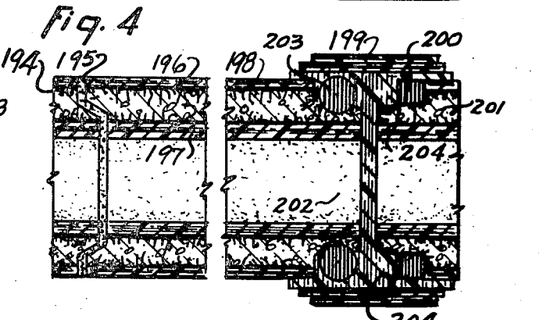
FIG. 4 is a longitudinal section of FIG. 3.

FIGS. 3 and 4 show a cross-section and a longitudinal section of a composite concrete prestressed pipe, or the like, and reinforced by different constructions than in FIGS. 1 and 2. In the drawings, member 195 represents a conventional joint and members 196 and 197 a the inner and outer envelopes prepackaged in advance of the necessary materials used. Such materials can be filament wound glass fiber embedded in a polymeric resin composition, e.g., an unsaturated polyester resin composition or an epoxy-polamide resin composition in "B" stage enclosed in a polyethylene resin film which is removed at least on the bonding side of the enveloped material to the concrete sie. An adhesive layer of bonding resin, e.g., epoxy resin having a curing agent therefor, may be applied prior to placing the enveloped material. Member 198 may be cconcrete made by the spray-spinning method described originally in my patent application Ser. No. 229,852, filed June 4, 1951, a portion of which is now U.S. Pat. No. 2,850890.

Member 199 shows successive laminations of enveloped materials that are used in providing prestressing forces into the joinery made between the pipe bodies as well as provide a very strong structural connection thereto. Member 200 represents a resilient shock absorbing construction in the form of a ring and and made of reinforced polymeric resin composition-glass fiber and/or having other discrete materials e.g., fillers. Member 201 represents a designed shoulder cast on the pipe body adapted to shock absorbing construction. Particularly is shown a beveled face being next adjacent the shoulder having an angle made to a close tolerance of slope, e.g., 2 percent tolerance, but not limited thereto, so that the shock absorbing construction can be put in place easily and accurately for purposes of load transfer without damage to the shock absorbing construction of the joint before it is polymerized and made unitary with the concrete. Member 202 represents the inner liner and has a high coefficient of smoothness, e.g., cellophane which is derived from cellophane being used as the envelope material. Member 202 also has a surface and construction more effe ctive against cavitation than currently used materials, the polymeric resin composition being a high strength epoxy resin-filler-fiber composition wherein the epoxy resin is copolymerized with a polyamide resin and has a good degree of flexibility. The filler may be a ceramic type filler, or mineral "whiskers" of aluminum silicate or other high strength material resistant to impact forces of cavitation and cushioned in the polymeric resin composition to absorb shock, and also to afford long life wearing surface exposed to the flowing fluid in the pipe.

Member 203 is another construction similar to member 200 and is used in a similar manner. Member 203 being a circular member is placed easier as it can be rolled into place into the groove prepared for it in the concrete body 201. I have found it convenient to have member 203 slightly less in diameter than the groove so that it is under a tensile loading before being polymerized into a thermosetting joint unit because of the greater strength obtained by this prestressing means. Also this joinery means can be an embodiment containing wires 19 or otherheating means to aid in polymerization by heat as disclosed in my application Ser. No. 267,166, filed Dec. 17, 1951, and a portion of which is U.S. Pat. No. 2,671,158.

Member 204 represents a joining of two adjacent sections of pipe and is made in several ways, one of which can be the wrapping of glass fiber roving or other fibers around and around the joint and impregnating the mass with a quick setting thermosetting or thermoplastic resins, elastomerics or combinations thereof, and polymerizing and curing the same under ambient temperatures. Member 204 can be an envelope prepared in advance containing such materials and placed at one time. The advantage of this joinery means is that all pipe are simply cast and with out "bells." Such pipe can be made in the field by simple means.

Figure 5:
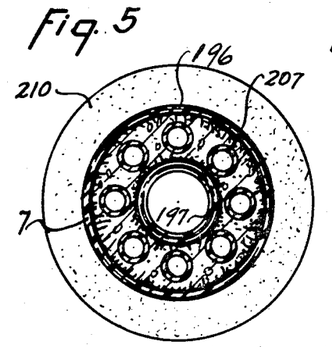
FIG. 5 is a cross section of an embodiment of the invention and having a system of internal pipe within the body of the main pipe wall.
Figure 6:
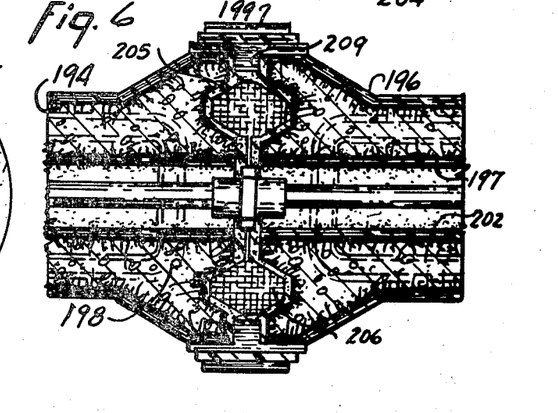
FIG. 6 is a longitudinal section of FIG. 5 and showing joinery means.

FIG. 5 and 6 show a cross-section and longitudinal section view of a prestressed concrete pipe reinforced as in FIGS. 3 and 4, and in addition provides a system of internal reinforced pipe within the body of the main pipe wall which is joined in a plurality of units resistantly resisting, yieldingly resistant constructions.

In the drawings, members 196 and 197 show the outer and inner envelopes of plastic resin-fiber reinforced constructions. Members 202, 199 and the surface of 207 are similar to member 202 in FIG. 4. Member 204 represents a polygonal type of joint construction possessing great strength and comprised of several cable-like fiber 7 constructions and is particularly useful in large conduits. Member 206 is made of a similar member having layers of fabric and plastic resins and possessing great strength and resilient resistant characteristics. Member 208 shows a socket type of recess for said members 205 and 206 that can be cast in the field in constructions using a simple type of form or shutter-like construction and is suitable for large sized conduits. Further, such construction provides maximum shock absorbing capacities in that members 205 and 206 are very highly resistive to impact -inpulse loadings. Member 209 represents very high strength bonding and sealing means. Members 207 represent the internal pipe system within the body of the concrete and can be prepared envelopes of the materials disclosed in my application Ser. No. 267,166, filed Dec. 17, 1951, and a portion now being U.S. Pat. No. 2,671,158. Some of these constructions can be inflated by fluid pressure during the process of the manufacture of the concrete pipe body and can be interconnected between sections by member 198. Member 210 represents the exterior face of the bell of such a pipe which bell is of substantial strength and substantial size.

Members 196 and 197 can be made of polymeric resin composition-fiber reinforced constructions that have specific structural and corrosion resistant values and not limited in comparison with existing concepts, e.g., the spalling and cracking of concrete pipe lines under earthquake or blast is practically eliminated. Since the materials I use make impervious surfaces and constructions, I make pipe lines and large conduits that are protected against permeation of the usual raw concrete of conventional pipe bodies by chemicals or permeable radioactive fallout substances which could enter through the wall of a pipe line or through its joints when failed in shear from blast. Like wise, the interior liner construction affords the same protection. Joints already tested in an approved A.S.T.M. Laboratory have given 2,000 to 3,750 lbs. per square inch in shear, and in all cases the concrete failed and not the polymeric resin composition-fiber reinforced joint of my invention. I make connections having shear values in excess of the strength of the concrete in compression when failed in shear.

Figure 7:
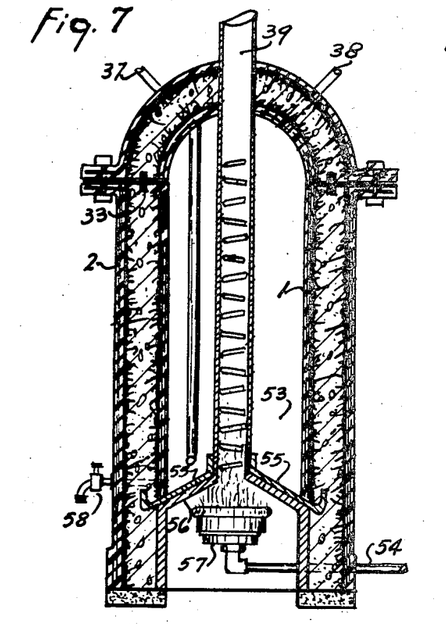
FIG. 7 is a view in vertical section of a tank or process vessel.

FIG. 7 shows a section through a gas fired water heater or process tank. A precast concrete shell 1 and a dome shell 1' are provided with inner and outer polymeric resin composition-fiber reinforced surface construction layers. Concrete 1 of the shell and dome can be lightweight high porosity concrete adapted to provide a high degree of insulation, .e., pumice concrete, perlite concrete or vermiculite concrete. The laminated layers can be made of glass fiber in any of the above disclosed constructions, e.g., filament wound glass fiber roving embedded in heat resistant epoxy-phenolic resin composition, and bonded and integrated to and with the concrete. Also the resin composition could be an unsaturated polyester resin composition, or a modified high heat resistant polyester resin composition containing a silicone resin composition or other resin composition, e.g., a silicone resin composition used alone.

A spline joint 33 is advantageously used comprised of my polymeric resin composition fiber reinforced construction that can be polymerized in place after the dome and body shell are bolted or otherwise fastened together, e.g., bolts 51 in brackets 52. A gas feed 54 feeds burner 57 which heats fire dome 56 which vents through stack 39 baffled to conserve heat. Fire dome 56 is supported by cast in brackets 55 in the body shell. Fluid is fed in by line 37 and taken out by line 38 with drain line 58 serving to drain the vessel. The strength of such vessels or tanks can be very great by my invention and their cost less because of the low cost of the needed materials. Also no corrosive tank problem is had and the fire dome is easily replaced.

FIG. 8 is a unitary cast tank body of lightweight concrete set on a cast base. This tank can be made to sustain extreme high pressures in that the laminated exterior or the interior surface construction layer is bonded and tied by means of looped construction 222 cast in place in the raw concrete. By building the tank on a mandrel additional high strength helically wrapped fiber glass roving or other reinforcement can be provided for both inner and outer surface construction layers. The helically winding of glass fiber roving on a stainless steel mandrel or an aluminum mandrel as a filament wound construction provided as a tensile wound construction is considered the highest strength material obtainable. Such construction is disclosed and claimed in the parent application Ser. No. 427,861, filed Jan, 1965. Loops 22 are shown as a part of the exterior surface construction layer but such loops 222 can be also placed on the interior surface construction layer as part thereof. The loops are continuations of glass fiber roving securely tied in with the main body of the filament wound roving. Concrete 1 is cast in place about these loops on the partially cured or fully cured surface construction exterior layer. The concrete may be conventional lightweight concrete or it may be a resin bound aggregate concrete, .e.g., pumice aggregate bound with unsaturated polyester resin. The inner liner 53 can be made of polymeric resin composition 3 of high heat resistant resin, e.g., silicone resin, reinforced with glass fiber rovings and mat 2. Fillers such as "whiskers" of aluminum silicate fibers can be used in inner liner 53. Member 37 provides an inflow line and member 38 provides an outflow line with member 61 represent typical connections. Electrical power is supplied to heating element 59 or any other type heat supplying elements are used. The base is joined by elements 33 and 51. Member 58 provides a drain line to the tank.

Figure 9:
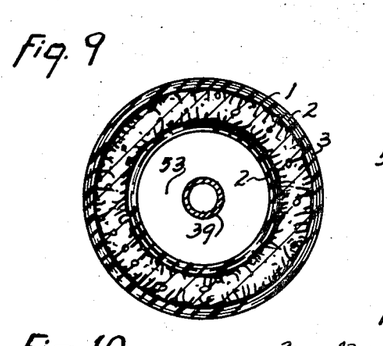
FIG. 9 is a cross section of FIG. 7.

FIG. 9 is a cross section of FIG. 6 and shows the wall section.

Figure 10:
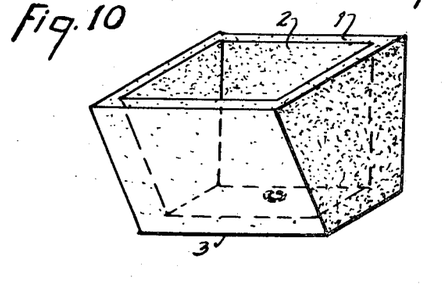
FIG. 10 is an isometric view of a tank or vessel.

FIG. 10 is an isometric view of a polygonal shaped tank and employs any of the features above disclosed adaptable to such a construction.

Figure 11:
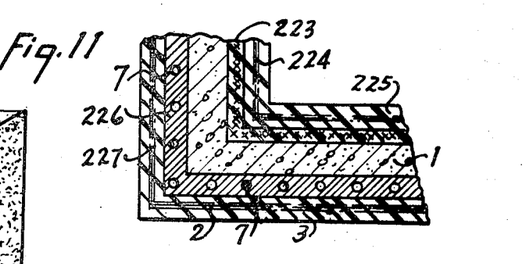
FIG. 11 is a sectional fragmentary view of a portion of a wall of a prestressed cylinder, angular tank or vessel.

FIG. 11 is an enlarged scale section of a composition structure of the invention. Here a central body of concrete has on each face a coating 223 of polymeric resin binder with fillers and mat-type fiber glass reinforcement. A unidirectional embodiment of high strength glass fiber 224 which, e.g., can be made of parallel fibers, cables, rovings, cords of glass fiber, ropes, wires of metal, synthetic fibers, or other tensile strong material, i.e., in the range of 10,000 to 400,000 p.s.i. tensile strength laminated to and in the resin-plastic over the mat reinforcement of the inner layer 223.

Embedded in, or instead of, one of the layers 223 or 224 may have metal tubes or wires provided for circulation of fluids or for electrical resistance heating. On the surface of this structure, a plastic-resin-layer having a selected polymeric resin composition binder is integrally combined in structure. This constitutes the wearing surface and may include decorative colors, marking colors, fabrics, papers or prints.

Figure 12:
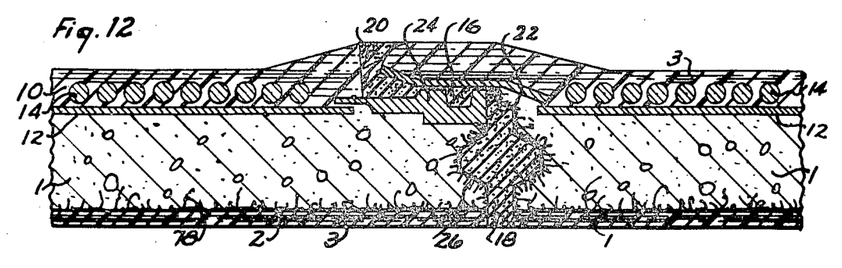
FIG. 12 is another section view of an embodiment of the invention.

FIG. 12 shows an improvement on existing pressure pipe. The concrete element, or resin-crete or elastomeric-crete concrete element 1 is precast against a metal shell, e.g., steel cylinder 12, and has known end ring connections, e.g., a bell ring placed over a spigot ring which has a rubber gasket as disclosed in F.F. Jenkins U.S. Pat. No. 2,348,477, issued May 9, 1944 or like that disclosed in L.G. Wilhelm U.S. Pat. No. 2,407,009, issued May 10, 1949. The steel shell 12 is spirally wound with prestressing wire 14 in the known manner. Since the prestressing steel reinforcement in this example is near the surface it is usually covered with a layer of concrete. In areas of contaminating soil enviroment, e.g., acid soil, the steel reinforcement can be destroyed by acid action through the thin concrete shell covering. In an area of earthquakes or the like, vibratory forces tend to spall or crack the concrete and open the steel to attack and corrosion.

By means of this invention a "spray-spun" or otherwise applied laminated layer 10 of fibrous reinforcements 2 and polymeric resin composition 3 and having a resin filler therefor, e.g., silica powder, asbestos, or other protective fillers, e.g., an epoxy resin based lead filled thermosetting compound that provides a homogenous laminated surface construction layer adapted for use as a radioactive shield, or other high density shielding compounds provide protection of vital pipe line structures or vessels.

Such a compound can be a composition of about 90 to 95 percent lead by weight and have a density of from 5.5 to 6.7 grams per c.c. By reason of the epoxy component the compound is stronger than pure lead and even without fibrous reinforcement has more structural rigidity than pure lead. Materials such as aluminum silicate whiskers, ceramic whiskers, or boron whiskers, etc., when made a part of the compound provides great strength and otheuseful properties to chemical and radiaoactive resistant constructions. No limitation is intended in the use of such materials because new materials are constantly being presented.

Other materials, e.g., polyethylene resin and lead can be used in a composition of about 90 to 95 percent lead by weight and 5 to 10 percent by weight of polyethylene (hydrocarbon polyethylene) which has a specific gravity of about 6.5 to 7.0 grams per c.c. The polyethylene lead binder does not contain nitrogen or oxygen and consists essentially of molecules of $C_2H$.

The polyethylene containing lead is melted at about 210° to 230°F. into a low viscosity fluid. At the melting point temperature and up to 300°F. the fluid is of a nature that fibrous reinforcement pulled through a dipping vat and wrapped around a mandrel or a concrete pipe element or block can be laminated into a layer of selected thickness when I do the operation in an controlled environment. By keeping the polymeric resin composition fluid it is easily worked.

Other resins and substances can likewise be used and the full art of resins contains materials adapted to the presencinvention.

The two examples provide a smooth finish and a shigh chemical inertness to a cide, alkalies and other corrosive influences and provide materials for use as a shield for nuclear applications. The high content of lead aids in shielding against beta and gamma rays. The hydrogen content in the polyethylene aids in shielding against neutrons. The formulations are infinitely variable even in the present state of the art.

Join 18 can be a preformed element which is of a packaged ready-for-use construction (or it can be made in place). It can be poured-in-place and of a material like 10. Joint 20 is advantageously made of epoxy-lead or polyethylene—lead composition and poured in the field on the installation of the pipe element. Shoulder 22 aids in holding joint 18 in place. Groove 26 can be a shape and size to receive joinery element 18 for a secure fit thereof. The inside of the pipe element 1 is advantageously laminated with a surface constructed layer comprising plastic resin composition 3, fibrous embedded reinforcement 2, e.g., Fibrafrax, an aluminum silicate fiber, fiber glass or or a high temperature ceramic fiber, laminated and bonded to pipe element 1 by fingers of resin and anchorages of plastic resin composition 78 in the body of the pipe element 1

Such a construction is designed to provide protection for potable water supply mains, and conduits or the like, against residual radiation fallout which can be brought into water supply systems through the concrete walls of the conduit systems, i.e., of the present concept of construction.

Figure 13:
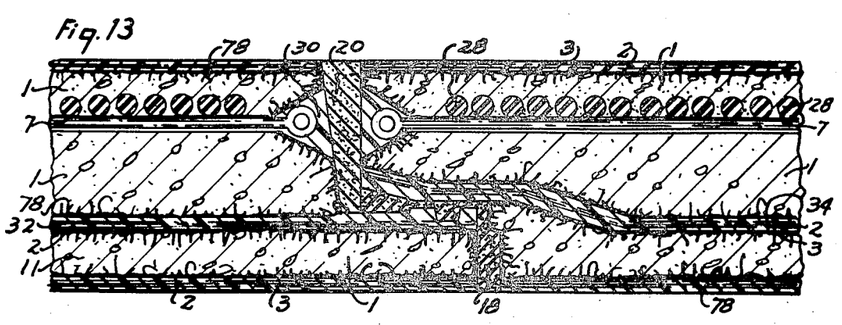
FIG. 13 is another sectional view of an embodiment of the invention.

FIG. 13 is another embodiment of the invention wherein all reinforcement is non-metallic being provided by glass fiber or other strands, fibers and fillers. A concrete element or a resin-crete or elastomeric-crete concrete element 1 is precast with longitudinal holes or slots in which to place cables 7. A helically spun fibrous reinforcement 28 is spun around the cables 7 and pipe element 1 and additional concrete 1 or "resin-crete" or "elastomer-crete" of my invention is cast around the outer face, when this is cured and set a surface layer construction lamination of plastic resin composition 3, a fibrous reinforcement 2 and/or 7, and a surplus of resin composition over that needed to impregnate the fibers is bonded into, on and of the concrete body of 1 as shown permeated into the body at 78.

On the inside face of the pipe element 1 laminated layers 32 and 34 are provided bonded to the porous structural material 1 which has an inner lining surface construction layer of plastic resin composition 3, fibrous reinforcement 2, bonded to the said structural porous material 11, e.g., a lightweight concrete or e.g., a high density concrete, by "fingers" of resin composition 78, or a chemically resistant resin-crete or elastomeric-crete.

When desired, cables 7 are secured by high strength resin composition 30 at the end anchorages. Joints and joinery 18 and 20 can be lamintated preformed joinery of my invention or can be poured in place resinous or plastic compounds adapted to specific needs and uses. A balanced designed structure or construction is made from the various elements and the preferred construction is adapted to resistance to high dynamic loads as well as resistance to chemicals or radioactive agencies. The resiliency of structure is of primary importance and I prefer embodiments being tough and rubbery and resilient rather than brittle and hard. The original high compression values of the concrete or other porous structural materials are increased substantially and the concrete properties in tension, shear and torsion are materially improved, and in a designed structurally engineered manner.

Figure 14:
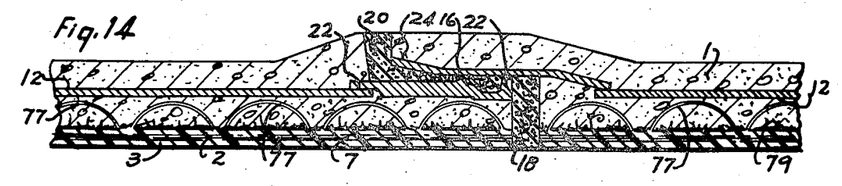
FIG. 14 is another sectional view of an embodiment of the invention.

FIG. 14 shows a preformed laminated polymeric resin composition construction layer having fibrous looped cables 77 comprising reinforcements 7 a part thereof and extending in looped fashion into the porous structure of the compositie materials. The laminated layer may be a helically wound filament of glass fibers comprising filaments wound at selected angles equally opposite to each other, e.g., 45° or 53.6° or 26.4° or other designed lay and cross-lay. The loops can be formed by laying longitudinal rods of selected diameter along the core upon which the winding is being done so that loops of fibers can be extended into loop shape and the rods removed after the loops are formed. The layer of porous structural material is then placed over the looped cables 77 and then covered with a strong steel sheet 12 or a glass fiber lamintated sheet both having imper bility and strength properties for the pipe structure. The glass fiber laminated sheet may be made of prepared ready-for-use laminated materials as shown in my prior patents. An additional layer of concrete 1 is placed over sheet 12 which may be conventional concrete or may be resin-crete or elastomer-crete of my invention. A high strength bonding resin, e.g., epoxy-polysulfide resin composition 79 bonds the inside linar to the concrete 1, Joinery elements 16 in joinery element 22 provides a groove for locking in poured in joinery material 20, and joinery element 24 acts in combination to form a seal with joinery element 18. While elements 22 and 24 are made of metal or rigid plastic-fiber-composition, elements 20 and 18 are simple resin-crete or elastomeric resinous compounds. Any of the features of FIGS. 1–12 may be used in combination with the disclosures of FIG. 14.

Figure 15:
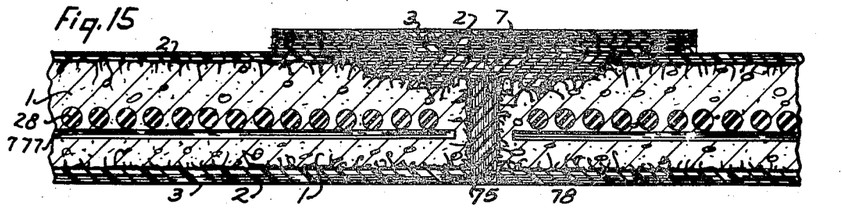
FIG. 15 is another sectional view of an embodiment of the invention.

FIG. 15 shows a typical centrifugally cast concrete pressure pipe embodying features of this invention. Reinforcement 777 and 28 is first assembled into a "cage" and then the concrete is spun around it as in the Hume Process and cured. In place of steel being used for reinforcement 777 and 28 I have used glass fiber-polymeric resin constructions and have a superior construction that is lighter weight and impervious to fluid as well as stronger. By making an inner liner comprised of a selected polymeric resin composition 3, a mat type reinforcement 2 and having unidirectional reinforcement 7 in the lamination wound in a helically applied manner, the construction is able to withstand high pressures while at the same time being impervious to fluid. The inner liner also has very good resistance to dynamic loadings as come about from sonic booms or earthquakes. By using a liner in a partially curved condition and providing a bonding layer of e.g., epoxy resin composition having a tolerance for water for conbind layer 78 the concrete layer placed thereover is securely bonded to the inner liner. A plurality of reinforcements 777 are placed over the concrete 1 and then cables 28 are helically wound over the reinforcements 777. Elements 777 and 28 may be coated with the same resin composition bonding layer 78 and additional concrete 1 applied thereover. At this point in themanufacture, the concrete and polymeric resin compositio nmaterials may be cured, .e.g, in a steam kiln in the conventional manner, after which the outer protective layer construction can be applied. This may be a glass fiber mat 2 having a polymeric resin construction 3 as a binder that is impregnated into the concrete 1 to a desired depth. Alternatively, the outer cover can be a helically wound filament glass fiber construction wound under tension. Sections of pipe thus finished are joined together by element 75 comprising polymeric resin composition glass fiber or other fiber reinforced joinery construction. For added strength for pressure pipe lines layers of glass fiber reinforcement 2 bound by polymeric resin composition 3 are laminated to the concrete pipe body to form a strong joint. The recessed surface of the exterior face of the Hume Protecss concrete pipe component and its particular configuration provides good anchorage for the laminated multiple layered reinforcement comprising the joinery means. A package ready for use lamination can be easily applied in the field and polymerization reaction accomplished by ambient setting resins or by sun heat or sensible heat. Such a construction makes a very good resistant to corrosion pipe line.

The accepted designs for such pipe line constructions in the prior art do not meet the indicated needs for atmoic blast and resultant fallout, and never have adequately met the needs of natural forces like earthquakes, or tornados or flood. The brittle characteristics of concrete per se, or other porous structural materials of high compressive strength and low tensile strength, as is concrete, is definitely modified and improved by this invention. I make concrete taken on new properties in flexure, tension, compression, shear, and torsion, and particularly in flexure, by the improvements of this invention wherein I chemically prestress prestressed preloads in concrete, by said chemical means alone, or in combination with thermal and/or mechanically induced prestressed preloads. By changing the structural material characteristics of concrete or other porous structural material after it is precast and cured and "preshrunk," the very nature of concrete as a material is changed by this invention. It is a composite material having the properties of its original component materials and a set in combination with set plastic resin compositions that are reinforced with fibrous reinforcements or fillers, ore are used alone for their own properties, and/or as reinforced by internal presetressed preload force systems.

Concrete is a brittle glass like material which spalls on impacts. By this invention it is now a tough, rubbery, denser, stronger material in which the concrete body provides in its pores the storage space for the plastic resin reinforcements in and of the bodh as well as the best anchorages for laminations f glass fiber or other fibrous reinforcement, as well as conventional steel and prestressing reinforcement in its body or in the laminated layer above the surface of the body of the concrete as being adhered and bonded to the said concrete body.

As a further improvement for certain embodiments, elastomer ic resin bound aggreates or polymeric resin bound aggregates which provide a concrete of the invention reduce costs and improve funcitonality and uses of the invention. Particularly in making corrosion resistant pipe I find that elastomercretes and resincretes of my invention can be made more resistant to acids and alkalines that Portland cement concrete. By selecting an aggregate that it itself resinstant to the particular acid or other matierial being conveyed in a pipe line, and combining this aggregate with a selected resistant polymeric resin composition and form thereby a resincrete or elastomercrete, I have a composition and form thereby a resincrete or elastomercrete, I have a composition of high strength and impervious mature that is better than Portland Cement concrete, i.e., for the particular properties selected.

In the manufacture of pipe of the invention the quick curing features of elastomercrete or resin-crete stand in good relation to low cost manufacture of the pipe products.

The basic design of the composite pipe of this invention requires consideration of the specific enviornmental uses of the said pipe. Examplary resitances require resistance to sulfuric acid and salt solutions, chlorine bleach, sodium sulfide solutions, hydrogen sulfide gas, zinc sulfate, sodium sulfate, condensates, hydrochloric acid solutions, caustics, caustic soda solution, sewage, soft water, citric acid, salt water, etc., Glass fibers and othefibers, as well as metallic reinforcmeents have known reliability in use in particular environments. It is highly important to select particular materials foparticular environmental uses.

For example, I have found that glass fiber pipe having about 73 percent glass fiber to 25 percent polymeric resin composition when used in extremely corrosive conditions lose mouch of their strength in a relatively short time because the glass fiber becomes exposed to the corrosive fluid due to an insufficiency of cover by the polymeri resin composition. Of course different resins also have differeent capabilities. A polymeric resin such as a polyester resin made of bisphenol-A hydrogenated bisphenol resin, or bisphenol-A-fumerate resin provides good resistance to oxidizing acids. Selected epoxy resins with a curing agent therefor also have selected capabilities. When fire resistance is also required, 3 percent antimony trioxide ($Sb_2O_3$) added to such a resin gives fire retardency.

For example, but not limited thereto, by providing a resin-rich interior surface latyer from 0.01 to 0.03 inch thick, or thicker layer of 0.1 to 0.3 thick, as the interior face of a composite pipe construction, an improved resistance to corrosion is provided. By adding a selected filler or reinforcement such as silic a or other mineral, or surfacing mat such as acrylic fibers both selected resistance to corrosion and reinforcement is made part of the pipe structure. Following this first layer with a chemically resistant layer comprised of 25 to 35 percent polymeric resin composition to 65 to 75 percent glass fiber to make at least 0.1 inch thick reinforcement structure, the reinforcement glass fiber is protected by the first layer of resin rich resin. I have found that silica sand or crushed quartz particles make good protective fillers.

Recently, glass flakes have been made available by Owens-Corning Fiberglas Corp., and glass flakes applied in a chemically resistant chlorinated unsaturated polyester resin like for example, Hooker Chemical Co., Polyester Resin 93A and applied in from 50 mils to 100 mils layer provides a very good chemically resistant layer. The glass flakes by being pressed on, or trowelled on, or laminated on readily orient themselves into layers so that a thickness of about 75 mils would have about 250 to 275 layers of glass flakes overlapping like fish scales and making a tight, laminated structural layer. The glass flake-polymeric resin composition has a low coefficient of linear expansion. It is also resistant to thermal stresses and shock and impact stresses. Curing shrinkage of the resin is reduced by addition of glass flakes. If an unsaturated polyester resin of the type above described is used, such a glass flake filled resin composition can be used for both erosion and corrosion resistances in conveying slats, mineral acids and particular organic chemicals at temperatures up to 200° to 225° F., for example, chromic acid or wet hot chlorine.

By making the exposed face of the pipe with the above described resin-rich face and backing up this face layer with the glass flake-polymeric resin layer, and then applying the filament wound glas fiber reinforcement layer, the structure becomes planned, designed corrosion resistant pipe structure.

For additional features depending upon conditions of use, enviornment again dictates pipe design.

An embodiment can be made by taking the above described construction and continuing the winding of additional glass fiber unidirectional strands embedded in an epoxy-polyamide resin composition which contains a filler comprised of inert mineral aggregate, for example, sand, pumice, fire expanded clay or shale particles.

The epoxy-polyamide resin composition is loaded with about 40 percent filler or more. Such a heavily filled resin compositiion is carried on the glass fiber strands of roving so that a thick layer of these materials are built up on the mandrel. The resultant composite layer can be for example one-fourth inch thick, one-half inch thick, or even 3 inches thick, but not limited thereto. By this method a concrete-like pipe is built in one continuous operation.

The exterior face of the pipe structure can be further wrapped with a glass fiber filament wound or a mat type high content resin rich layer, or even a pressure applied resin rich face to make a resistant to corrosion surface.

The lamination layers in total result in a concrete-like pipe whose total resin content can be as low as 25 percent or, as high as 75 percent, but whose mineral aggregates are resin bound into a concrete-like body. Such a resin bound concrete pipe is selectively resistant to-corrosion which resistance is determined by the particular resin system used to the type of fiber and fiber used. It is definitely superior to many uses of Portland Cement pipe.

Another feature is that resincrete and elastomer-crete concrete can be cut with a saw and if broken, patched by replacing material of the invention. Joinery can be butt-joints or bell and spigot or specially shaped systems of joints of the invention. Wrapped joints of glass fiber or other fiber and polymeric resin compositions are made fast and cheap. Fittings can be made of the same materials or can be mcomposite materials of metal and reinforced plastics.

At times composite structures are utilized particularly in transition boxes and connections to processing vats. Irregular shaped pipe and vessels result. To accomplish these structures I resort to precast concrete or resincrete or elastomercrete and make up elements in a block machine or forms standarized or special to build the particular irregularly shaped structure needed. These elements are joined together by polymeric resin composition fiber reinforced joinery as above described. Depending upon the casting means, circular, hexagonal, or octagonal, etc., shaped sections can be made.

Among the many mineral fillers I have used a resin-crete and elastomer-crete concrete aggregates are pumice, tufa, scoria, vermiculite, perlite, fire expanded clay, fire expanded shale, volcanic cinders, ground minerals, light-weight concrete aggregates, polymeric resin beads such as phenolic beads, glass flakes, fibers and wood flour, silic sand, concrete sand, and coral rock and limestone rock, and any of the standard fillers used in reinforced plastis as furnished by Whittaker, Clark and Daniel Co., New York, N.Y. These fillers aggregates are mixed and blended as in the manufacture of Portland Cement concrete but the binders are polymeric resins and elastomeric resins. Many sources are availabe for fine fillers and aggregates.

Another feature of importance comprises metal liners or reinforcements. Copper sheet, steel sheet, stainles steel sheet, metal alloy sheet, tin sheet, titanium sheet, lead sheet, beryillium sheet, and exotic metal sheet can be formed into cylindrical shape and used as a mandrel first and then left into the construction as a permanent part of the pipe construction. Alternatively, they can be otherwise used as shown.

Figures 16, 17:
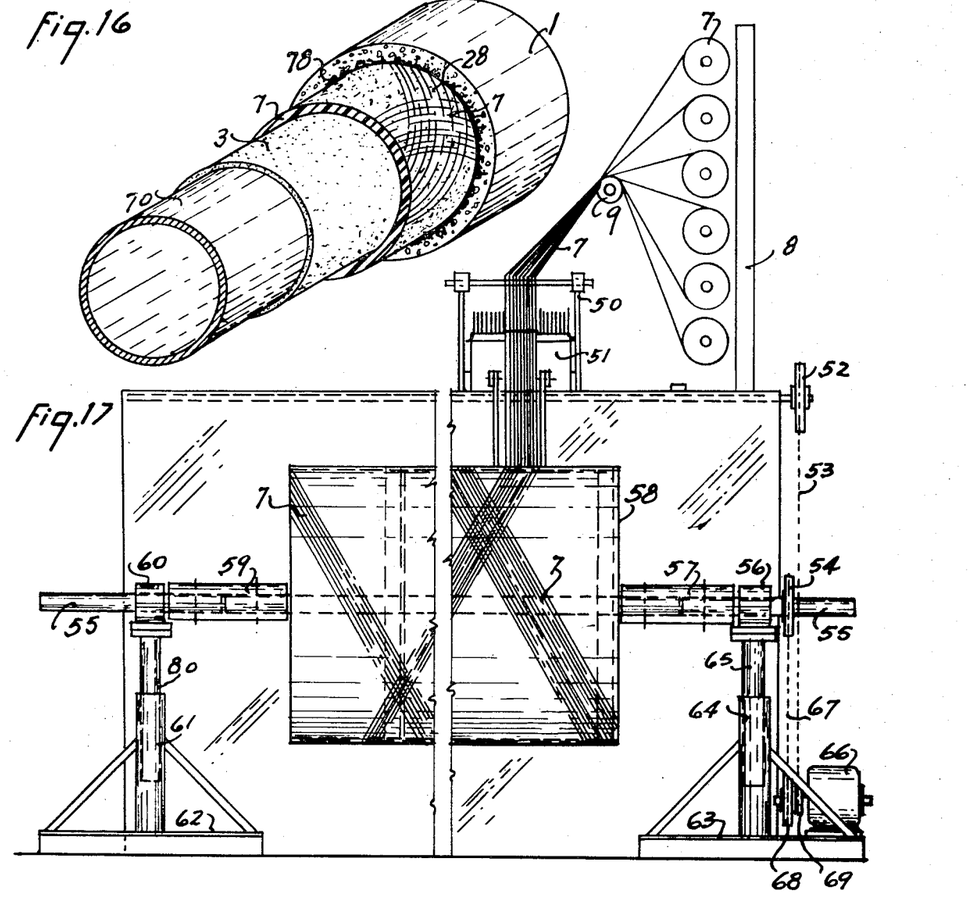
FIG. 16 is an isometric view of an embodiment of the invention.
FIG. 17 is an elevation of an apparatus of the invention.
Figure 18:
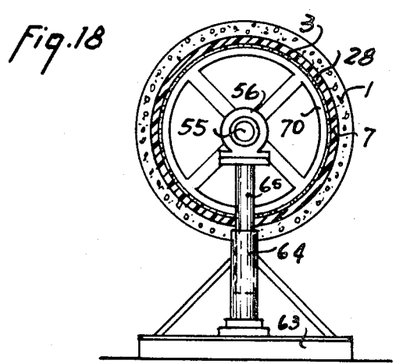
FIG. 18 is an end view of apparatus and product of the invention.

FIG. 16 shows a product of the invention as made on apparatus of FIG. 17 and 18. Element 70 shows a metal liner which is placed over the mandrel on which originally serves as a mandrel 58. This metal liner can be of copper, lead, stell, iron, stainless stell, titanium, beryllium or other exoitic metals or metal alloy, or tin, or plated metal such as chromium plated metal. The metal can be in foil, or sheet or plate depending upon the thickness used.

The liner can be omitted entirely and the resin-rich layer 3 be the first element of the pipe structure. Over a resin-rich layer 3 a plurality of fibers, e.g., glass fiber strands may be helically wound into layer 28 wherein the glass fiber strands are embedded in polymerizable polymeric resin composition.

Alternatively, I sometimes lay a glass fiber mat, or loose strrands, or chopped fiber, etc., into the resin-rich layer to form a resin resistant surface layer having specific properties supplied by the combination of materials used. Also fillers are disclosed herein may be used in said combination of materials.

In this FIG. 16, layer 28 comprises the major reinforcement of the construction while corrosion resistance is supplied by layer 3. When layer 3 has a filler, e.g., lead power and a suitable polymeric resin composition, it provides resistance to radioactive materials. The many fillers disclosed herein can be selectively used.

A surplus of resin composition over than needed to embed said fibers 7 or other fibers used can be impregnated into the concrete 1 as shown at 78. The concrete can be ordinary Portland Cement concrete or it can be resin-crete or elastomer-crete concrete of my invention. Because of the properties of the resin-crete and elastomer-crete concretes thinner sections can be used. While 3,000 to 5,000 p.s.i. concretes are normal to Portland Cement concretes, much higher strengths are attained with resin-crete and elastomer-crete concretes, e.g., 15,000 p.s.i. in compression and greater tensile strengths.

Faster production is obtained with the use of resin-crete and elastomer-crete concretes as it is possible to have continuous production on a mandrel, the fiber glass being placed with the resin-crete or elastomer-crete concrete in layers or in homogenous construction.

Additional apparatus not shown provides means for mixing and placing resin-crete or elastomer-crete concretes directly onto the mandrel with means for winding bein operative at the same time. Of course independent winding can be carried on. Composite construction of layer by layer or of integrated constructions can be supplied depending upon the specification of end product designs.

FIG. 17 shows essential portions of an apparatus comprising a mandrel mounted on a spinning device. A plurality of roving balls having biber glass fiber 7 are mounted on a dispensing rack 8 which in practice has means of dispensing under tension the fiber glass fiber rovings 7. A plurality of strands 7 are fed through an aligning comb mounted on glass fiber feeding means 50 into a dipping and impregnating pan 51 and the fibers are impregnated ready to apply to mandrel cylinder 58. Glass feeding means 50 and dipping pan 51 are attached to a moving means 52 driven by pulley 69 through chain or belt 53 by motor 66 and moves the glass fiber 7 back and forth across the face of the turning mandrel at a selected helical angle of helical wind.

Mandrel 58 has a shaft 55 driven by motor 66 through means 54 from pulley 68 by chain or belt 67. The speed of the drive of the spinning device is coordinated with the speed of the drive of the glass feeding means so that a selected lay and cross-lay pattern or a circular pattern is obtained. A circular lay provides a means for driving out the air sometimes retained in the helical lays, and also is a strengthening layer.

Mandrel 55 is supported on a pair of opposite strands 62 and 63 wherein 62 has a base member support 61 in which a slidable member 80 resides and 63 has a base member support 64 wherein a slidable member 65 resides. Bearing 60 holds one end of shaft 55 while bearing 56 holds the other end of shaft 55. Shaft 55 is a slit shaft at each end and is held together by sleeve bearings 57 and 59. The apparatus just described has additional elements not shown for making various embodiments of the invention.

FIG. 18 is a stripped down end view of the apparatus with a piece of product on it. The mandrel 58 has a metal liner 70 on it with resin-rich layer 3 shown thereon. Layer 28 shows the glas fiber reinforcing layerbonded to the concrete layer 1 thereover.

FIG. 18 is a view whose elements are shown over size for some embodiments. e.g., layer 28 could be a thinner element. When mandrel 58 is made of aluminum metal it can be heated and expanded slightly after a product is formed on it. This expansion serves to induce prestress preload into the fibers and materials on the mandrel when the polymeric resin composition sets and cures. Also after the made product returns to ambient temperature after curing it is possible to remove the finished product easily from the mandrel.

Figure 19:
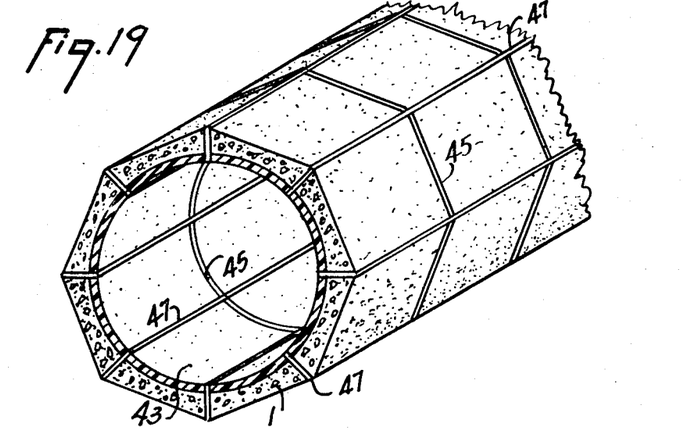
FIG. 19 is another product of the invention.

FIG. 19 shows an embodiment of the invention wherein elements 43 are precast elements made in a machine, e.g., a block machine, or a gang form. These elements have integrated and laminated surface construction layers 43 comprised of selected polymeric resin compositions reinforced with mineral fillers and/or fibrous reinforcements. The invidiual elements are made into beam-like members and are joined together by polymeric resin composition glass fiber joinery constructions 45 and 47. The individual elements are first joined by joinery constructions 45, i.e., into the beam-like constructions. Thus eight beam-like members form a pipe.

Figure 20:
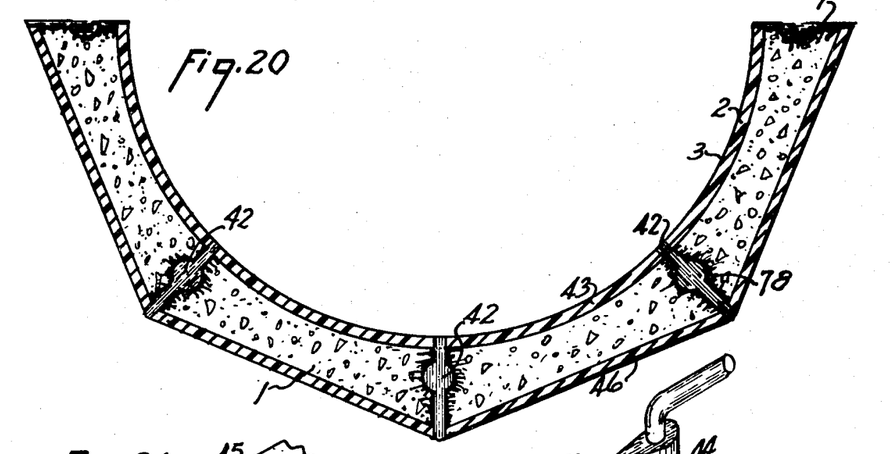
FIG. 20 is a section of a product of the invention.

FIG. 20 shows a trough or half section of a pipe wherein elements are made in a machine and have grooved edges. These are joined together by reinforced joinery means 42 wherein a cable-like element is a part of the joint. Also this embodiment has an exterior layer 46 comprised of fiber-filler reinforced polymeric resin composition.

Figure 21:
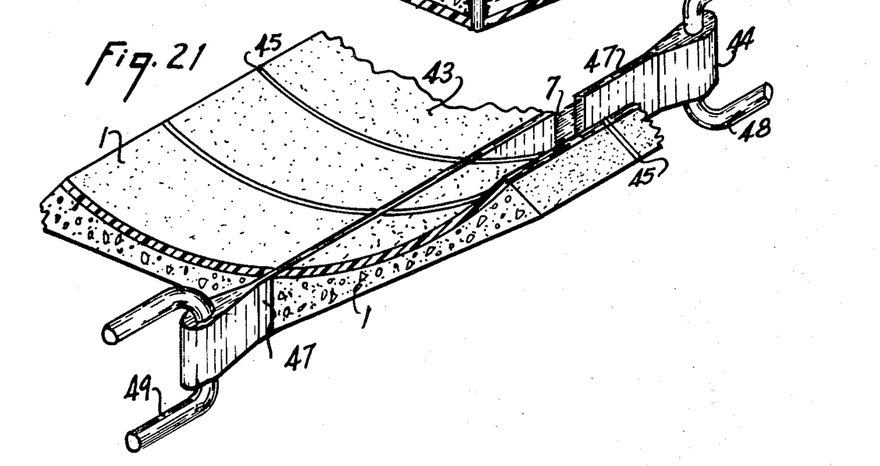
FIG. 21 is a partial isometric view of a product of the invention.

FIG. 21 shows how to prestress preload such glass fiber or other type joinery 47. Unidirectional fiber is wound around a pair of means so that said fiber is of even length and under substantially the same tension. In this form the ends are fixed with a set resin to retain said length. In use the prestressing means is placed in the end enlargements 44 and elements 48 and 49 placed in a stressed condition. The holding apparatus not shown presses the elements together and joint 42 is made by curing the polymeric resin composition in place. When the element is complated the end enlargements are cut off or if the construction is so designed, the end enlargements are left in place in the ends of the pipe. The polymeric resin composition may be penetrated and premeated into the material adjacent the joints as shown at 78. There are many polymeric resin compositions which may be used alone or in compatible combinations, or in functional functions in individual layers of the pipe structure. The resins and elastomeric resin compositions include epoxy resins, polyester resins, polyurethane resins, acrylonitrile-butadiene-styrene copolymer resins, acetal resins, acrylic resins, acrylonitrile-styrene resins, resins, allyl resins, amino resins, polyamide resins, polysulfide resins, butyrate resins, rubber resins, cellulose-acetate, cellulose-acetate-butyrate resins, cellulose nitrate resins, cellulose propinate resins, cellulose triacetate resins, chlorinated polyesters, chlorinated polyethyer resins, polypropolene resins, polyethylene resins, urethane resins, vinyl resins, rigid vinyl resins, vinyl chloride-vinyl acetate resins, ethyl cellulose resins, expandable polyestyrene resins, cellular vinyl resins, poylallomers, polycarbonates, polyvinyl dichloride resins, polyvinyl chloride resins, polyurethane elastomers, phenolic resins, urea-formaldehyde resins, furane resins, phenoxy resins, nylon resins, silicone resins and compatible combinations thereof.

The epoxy resins having a selected curing agent therefor, polyester resins, polyvinyl chloride resins, polyruethane resins, and phenolic resins are considered the preferred resins for many embodiment of the invention.

Glass fibers in it many forms is considered the preferred fiber of the invention.

EXAMPLE I

Provide an internally resistant corrosion resistant pipe.

Place a 30 inch diameter aluminum mandrel having a bell and spigot configuration and a highly polished surface in a pipe spinning apparatus and heat said mandrel to remove moisture.

Next, apply a 0.02 inch to e.g., 0.3 inch, thick layer of the following resin composition and build up a resin-rich layer:

| | |
|---|---|
| Unsaturated polyester resin — Atlac 382 . . . dry | 60 |
| Cab-O-sil — finely divided silica 1 to 10 | |
| Styrene Monomer | 40 |
| Lupersol DDM — methylethyl ketone peroxide in dimethyl phthalate | 1 |
| Antimony Trioxide | 5 |

Next, to a quantity of the above resin composition, add glass flakes until a buttery thrioxtropic mass is had.

Next, set up filament winding to provide about 1 inch to e.g., 6 inch wide band of 60 end roving and feed said roving band through a catalyst-resin bath of the above unsaturated polyester resin composition. Pass said band through a set of squeeze rolls to remove excess resin composition.

Next, pass said impregnated roving band through a feeder device which deposits a one-fourth inch thick layerof the thrixotropic glass flake filled unsaturated polyester resin composition on said impregnated roving band and then filament wind this combination of materials onto the resin-rich layer on themandrel. Continue winding said combination of materials in helically applied layers until a desired thickness of the same is obtained.

Since the catalyst is an ambient setting one use care to keep just enough catlysed material ahead so that the material cures on the mandrel.

If desired a heat curing catalyst can be used, e.g., benzoyl peroxide, and heat applied at e.g., 180° to 250°F. curing temperature to cure the resin. In this case, it is well to heat the mandrel to expand it from the inside and prestress expansion forces into the laminated structure of the pipe. Also in this case the pipe is readily removable from the mandrel when the mandrel returns to ambient temperature.

In place of glass flakes, or in combination with them, fillers such as silica sand, fire expanded clay or shale aggregates, pumice, vermiculite, clay, crushed rock particles, organic fillers, wood flour, etc., may be used as above.

EXAMPLE II

Using the same procedure as in Example I provide a corrosion resistant pipe resistant to both exterior and interior corrosion.

When the filament winding of the combination of glass roving the glass flake resin composition is completed as in Example I, gel said composition and only partially cure against flow.

Next, prepare a mixture of the unsaturated resin composition of Example I as follows:

|  | Parts by Weight |
|---|---|
| Unsatured polyester resin composition — Atlac 382 dry | 60 |
| Styrene Monomer | 40 |
| Silica sand —16 mesh | 30 |
| Silic Sand — 30 mesh | 60 |
| Fire expanded aggregate — clay | 200 |
| Benzoyl peroxide catalyst | 1 |

Adjust the handling characteristics of the mix by adding not over 5 percent styrene monomer to make a more easily worked resincrete.

Next, resume filament winding of the roving band and load the roving band with the maximum amount of the resincrete mix to each pass of the mandrel. Build up the desired thickness of the body of the pipe, for example, 3 inches thick. Apply heat as winding goes on and cure to a set and cured polyester resin composition pipe structure. When cured remove completed pipe ready for use.

EXAMPLE III

Make a pipe liner as in Example I, e.g., 30 inches in diameter.

Provide a vibrator equipped cylindrical form having a body selectively larger than the pipe liner, e.g., 36 inches I.D.

Insert said 30 inches dia. pipe liner in said form and leave a space of 3 inches all around said pipe liner and said form. Prior to said insertion of said pipe liner, cover the pipe liner with a bonding resin composition comprised of

|  | parts by weight |
|---|---|
| Epoxy resin composition — Shell 828 | 60 |
| Polyamide Resin — Versamid 140 | b 40 |
| DMP 30 — Tridmethyl amino methyl phenol | 5 |

Next, cover the bonding resin composition with a mixture of 1 part Portland Cement to 2 parts sand to as thick a layer as will adhere.

Next, pour around the pipe liner a mixture of e.g., 5,000 p.s.i. concrete mix into said cylindrical form and vibrate the form to consolidate the concrete.

Use only enough water in the concrete mix to wet out the Portland Cement. On completion of placement of the concrete remove the form and cure the concrete in known manner, making sure that the bonding resin composition has gelled against flow.

EXAMPLE IV

Make a pipe liner embodiment as in Example I.

Provide a vibrator equipped form as in Example III. Cover the surface of the form with a silicone mold release.

Insert the pipe liner into the vibrator equipped cylindrical form and cover said pipe liner with a bonding resin composition layer comprising:

|  | Parts by weight |
|---|---|
| Epoxy resin—Shell No. 828 | 60 |
| Polyamide resin— General Mills Co. Versamid 140 | 40 |

Next, prepare a resin-crete concrete as follows:

|  | Parts by weight |
|---|---|
| Epoxy resin—Shell No. 828 | 60 |
| Polyamide resin—Versamid No. 140 | 40 |
| DMP-30 Tridimethyl amino phenol | 2 to 5 |
| Fire expanded Clay aggregate ¾-inch mesh | 400 |
| Silica sand 16 mesh | 50 |
| Silica sand 30 mesh | 50 |
| Silica sand 60 mesh | 50 |

(Vary amounts of aggregate and sands to provide workability of the mixture due to binding characteristics of local materials used.)
(Resin portion of the mixture may vary for different uses from as low as 7% resin composition to 50% or other as needs dictate.)

Next, place said resin-crete mixture into the form about said pipe liner and vibrate until well consolidated. Cure to a final state of cure. Time of cure can be varied by amount of DMP-30.

EXAMPLE V

Make reinforced composite concrete pipe of resin-bound concrete.

Provide an aluminum mandrel mounted in a spinning device and apply thereto a mold release.

Next, apply a layer of polymerizable polymeric resin composition over this layer of mold release.

Next, spin a plurality of helically wound glass fiber strands to form an impermable layer, said strands being impregnated in some of the resin composition before laying.

Next, partially cure said resin composition to a gelled state against flow.

Next, apply, integrate and laminate to a selected thickness, e.g., ¼-inch, or ½-inch or 3 inches, additional polymerizable polymeric resin composition having a substantial portion of the composition comprised of mineral filler and providing a resin-bound concrete or resin-crete body bonded to the said helically wound glass fiber strands. Such a polymerizable resin composition can be made as follows:

|  | Parts by weight |
|---|---|
| Epoxy resin composition Shell No. 826 | 60 |
| Polyamide resin—Versamid 140 | 35 |
| Toluene | 5 |
| Silica sand | 400 |
| Cab-O-Sil—finely divided silica | 5 to 50 |

Next, spin a plurality of helically wound glass fiber strands to substantially cover the surface of said resin-crete concrete and make an impermeable cover over the said pipe.

Next, cure the resin composition to a final state of cure and remove the pipe from the mandrel ready for use.

The fillers used in these formulations may be selected from the group consisting of silica sand, pumice, tufa, perlite, vermiculite, expanded shale, expanded clay, cinders, and ground minerals, and lead powder.

An alternative method requires the use of fibers added to the polymerizable resin composition, e.g., glass fibers, sisal fibers, cotton fibers, hemp fibers, etc. For making very high strength constructions the now ceramic fibers and whiskers, e.g., silica carbide whisker filament a comprising composite filaments of oriented whiskers in a resin-bonded matrix made by the Carborundum Company of Niagara Falls, N.Y., may be used. The resin binder may be removed by heating a few layers of the filaments to 600°C. in air for about 15 minutes. The filament will be converted to a yarn of oriented whiskers with sufficient integrity for further processing in a formulation as above.

The resin-bound concretes and the elastomer-bound concretes in combination with filament wound glass fibers or other fibers make concrete pipe bodies that have many new potentials as corrosion resistant concrete pipe constructions. No limitations are intended by the instant example because it points the way to many different material combinations defined herein as concrete and resin-crete and elastomercrete.

EXAMPLE VI

In this example I make use of precast elements made of raw concrete or resin-crete concrete or elastomer-crete concrete having a concave inner surface and a planar exterior surface. These concrete elements can be made in a block machine or other mass production equipment with the resultant low costs of mass production techniques. Hexagonal and octagonal sections can result from the integration of six or eight elements with the interior being a cylindrical surfaced construction. Other sections of a plurality of elements can be used.

The raw elements e.g., 7⅝ × 14 inches, but not limited to any size, on the planar face with the interior face being the arc obtained in any wall thickness, e.g., 4 inch wall thickness. The wall can be solid concrete or can be a cored concrete element as made on a concrete block machine and cured in the known manner. The edges of one or more of the raw elements can be grooved with shaped recesses or can have mated grooves and projections to form joints by methods of my invention.

The interior of the individual raw concrete elements, i.e., the curved face can be processed in the same way that I make concrete elements as disclosed in my U.S. Pat. No. 2,805,448 or as disclosed in my other patents. The finished laminated and bonded plastic resin fiber glass or other plastic surfaced and integrated constructions as herein disclosed can be made and stock-piled as ready for use elements for making into composite pipe or tanks or vessel constructions.

At a later date or at the same time, these concrete reinforced plastic resin fiber glass elements are assembled into partially closed or closed pipe elements or process vessels or tanks. The joints are comprised of selected resilient plastic resin or plastic resin-fiber reinforced or elastomeric plastics made into laminated constructions. The fiber when made of unidirectional strands or constructions may be pre-tensioned or post-tensioned reinforcement with predetermined amounts of prestressed preload provided.

An adapted frame not shown in the figures of the drawings is used to hold a number of elements so the features of prestressed preload forces can be applied in the integration of the concrete elements, plastic resin and a filler if used, and the fibrous reinforcements into a unitary structure, e.g., a pipe having an octagonal exterior shape and a cylindrical interior shape. By enclosing the reinforcement in a groove between the elements, the high strength tensile and flexural strength of the reinforcement is protected against chemicals and other adverse features including fire. Excellent atomic reactor vessels can be made in this manner. By making suitably shaped concrete, or resin-crete concrete or elastomer-crete concrete elements having tubes of designed hollow sections in the elements, cooling and processing features can be a part of the elements and of the wall structure of the reactor. The composite structure of the wall can be made to meet radioactive resistances required in such a vessel, tank, pipe or structure.

The features used herein are advantageously used in making elliptical shaped or other non-cylindrical shapes. Expensive forms for precasting such odd shapes are not needed because mass production equipment has no limitation on mold box shapes it uses and any reasonable precast element adapted to any elliptical or other shape can be made on such mass production equipment.

To illustrate but in no way limiting the concept of invention herein, the following shows one example of such construction:

Required to make an octagonal exterior shaped pipe 100 ft. long made of one 40 ft. horizontal length connected to one 30 ft. length made at 30° upward slope which is connected to one 30 ft. length made at 90° upward from the horizontal length.

Concrete elements of 5,000 p.s.i. compression tested raw concrete, e.g., fire expanded shale aggregate Portland Cement concrete, or 10,000 p.s.i. resin-crete concrete, or 15,000 p.s.i. elastomer-crete concrete elements are provided.

The concrete elements may be impregnated and permeated to an average depth of 2 inches by the plastic resin composition. Concrete elements to test to about 15,000 p.s.i. in compression, i.e., the composite material of plastic resin composition as a completed polymerised material in and of the concrete tests at 15,000 p.s.i.

Fiber glass cables composed of 65 percent glass by weight unidirectional fiber and enclosed in epoxy resin composition, the total fiber and resin material being enclosed in a polyethylene 4 mil tube, said cables have end enlargements with loops adapted to anchorage in mechanical prestressing equipment. Typical mechanical properties of a Cable-Laminate cured with 4,4' Methylene Dianiline using an Epoxy resin: molecular weight 350 to 400 — a cure cycle of 1 hour at 160°C. under pressure and post-cured 2 hours at 160°C. plus 6 hours at 200°C. have the following properties:

PROPERTIES

| | |
|---|---|
| Tensile strength, p.s.i. | 50,000–58,000 |
| Tensile modulus, p.s.i. $\times 10^{-6}$ | 3.3–3.6 |
| Compressive strength, edgewise, p.s.i. | 49,000–51,000 |
| Compressive modulus, edgewise, p.s.i. $\times 10^{-6}$ | 3.3–3.6 |
| Flexural strength, p.s.i.: | |
| At 25 °C. | 79,000–89,000 |
| At 127 °C. | 52,000–60,000 |
| After 2 hours in 100 °C. water | 77,000–82,000 |
| Flexural modulus, p.s.i. $\times 10^{-6}$: | |
| At 25 °C. | 3.6–3.9 |
| At 127 °C. | 3.0–3.5 |
| After 2 hours in 100 °C. water | 3.2–3.6 |
| Impact strength, Izod | 12–15 |
| Hardness, Rockwell M | 115–117 |
| Water absorption, 24 hour at 25 °C., weight gain, % | 0.05–0.07 |

The resin chemist in the knowledge of the art of resin compounding can provide designed constructions directed to specific end use requirements.

To assemble such a construction I first connect a series of elements end to end with resin bonded fiber glass reinforced joints as disclosed and claimed herein and in my other patents to form beam-like components 30 ft. or 40 ft. long as may be required for this structure. Lengths are made to form the angled connections as above required, the individual lengths being placed on a make-up table or platen and retained in holding harnesses. When all beam-like components are made ready the components are assembled in an adapted frame and the prestressing cables are layed in the grooved space in the edge of the assembled components so that the entire pipe line is put together ready for post-tensioning of the cables by means of the hydraulic jack devices disclosed herein and in my other patents. An induced mechanically applied prestressed preload is induced into each cable until the entire pipe line is in a prestressed preloaded state. The resin portion of the packaged cable is activated to polymerisation by means at this time and the induced prestressed preload captured as the resin composition sets and cures. Alternatively, or in cooperation therewith, the shrinkage forces of a selected resin composition is relied upon for the force systems of the prestressed preload and obtained during polymerization and cure. The polymerization can be from catalyst contained in a rupturable package which mixes into the resin when prestress preload is applied to the cable or it can be from heating means enclosed in the package or adjacent to the package cable as shown in my U.S. Pat. No. 2,671,158, or in other means of the art.

The resin composition can be a premixed composition which sets with time, a "pot-life" being had allowing for proper placement of the cable in the groove in the concrete component. The polyethylene envelope, e.g., a 4-mil tube can be removed prior to placement which I do in some constructions when I want to bond fiber glass cable continuously to the concrete. At other times all or only portions of the polyethylene envelope is left in desired places to form a non-bonded construction. The art of civil engineering applies here.

I sometimes make such a construction for use under sea water and in this case the exterior surface (and/or the interior surface) of the pipe line is laminated or covered by winding roving spaced close together or by mat held in place by rovings of fiber glass or other desired fiber or wire material which is bonded in place by a resin composition which may or may not have a filler therefor. Such a filler could be any disclosed herein having a compatible chemical specification.

The pipe may be wrapped as in Examples above or may be laminated by low pressure means. The concrete elements may be plano-convex in shape so that the exterior surface forms a cylindrical construction as for a column or a pile.

In making predetermined amounts of prestress preload that is induced into any given construction by the forces derived from the polymerization reaction I have found that combinations of resins each having specific properties provides a sure and ready means of deriving specific amounts of internal stress. As an example, stressing type of plastic resin composition can be made by using polyesters based on a variety of polybasic acids and polyhydroxyl alcohols that contain free carboxyl groups and/or aliphatic hydroxyls capable of reacting with the epoxy resins. The wide range of molecular structures possible for the polyester resins together with co-curing reactions occuring when they are combined with epoxy resins provide me with resinous compositions modified to specific end uses. Polyesters of certain characteristics as well as polysulfides or polyamides are used as flexibilisers.

The effect of the polyester on the epoxy resin on the combined properties is dependent on the acids and alcohols used in the synthesis and the number of members in the resulting resin chain. If other reactive elements are used or added, the properties can be varied even more.

The shrinkage of epoxy resins is of a low order while that of, e.g., polyester resins is of a relatively high order. Together with fillers and pigments I use the knowledge of the art of resin compounding to provide specific stress systems and characteristics.

EXAMPLE VII

In this example I make a composite construction having the advantage of both metal and plastic resin-fiber glass construction. As in FIG. 12 the metal sheet 12 can be formed of a sheet of copper, steel, stainless steel, metal alloy, tin, or in fact any desired metal material. The metal sheet can first be used in its rolled up form of a pipe as the mandrel upon which to wind glass fiber cables 14. The exposed outside face of the cables and sheet 12 is protected by a layer of resin-crete 10. On the inside of the metal sheet 12 a plastic resin composition such as an epoxy resin having a polyamide curing component therefor is applied for binding and bonding the sheet 12 to a layer of Portland cement concrete or resin-crete or elastomer-crete concrete 1 which is centrifugally spun into place. On the face of the concrete 1 a laminated layer of polymeric resin composition-glass fiber or another filler or fiber composition is laminated onto, into and of the concrete 1 to form an internal protective and corrosion resistant surface layer construction.

Alternatively, the sheet 12, e.g., a copper sheet may be placed as the internal protective and corrosion resistant surface layer construction.

Alternatively, the filler for the surface layer corrosion layer can be a copper, lead or other metal powder filler and the resulting polymeric resin composition, e.g., an epoxy-cold-tar resin composition, all provide protective features. No limitation is intended to the combinations of desired composite pipe constructions.

While certain preferred embodiments of this invention has been specifically disclosed, it is understood that the invention is not limited thereto, as many variations will be readily apparent to those skilled in the art and the invention is to be given its broadest possible interpretation within the terms of the following claims:

I claim:

1. A prestressed, reinforced, composite concrete pipe having substantial impact resistance to dynamic loading and being substantially impervious to the entrance of adverse chemicals, said pipe comprising
   A. a plurality of precast edge grooved planar-concave porous structural material elements having a polymeric resin composition fiber reinforced laminated surface construction layer end-joined together into beam-like members,
   B. a plurality of polymerizable polymeric resin composition embedded glass fiber cables and joinery materials comprising joints inbetween and bonding together said edge grooves planar-concave porous structural material elements beam-like members, and said glass-fiber cables existing in a prestressed state thus providing said prestressed reinforced composite concrete pipe.

2. A prestressed, reinforced, composite concrete pipe having substantial impact resistance to dynamic loading and being substantially impervious to the entrance of adverse chemicals, said pipe comprising
   A. a plurality of planar-concave structural material elements having a polymeric resin composition fiber reinforced laminated surface construction layer end-joined together into beam-like members,
   B. a plurality of polymerizable polymeric resin composition embedded glass fiber cable joinery materials comprising joints inbetween and edge joining together said structural material elements.

* * * * *